UNITED STATES PATENT OFFICE.

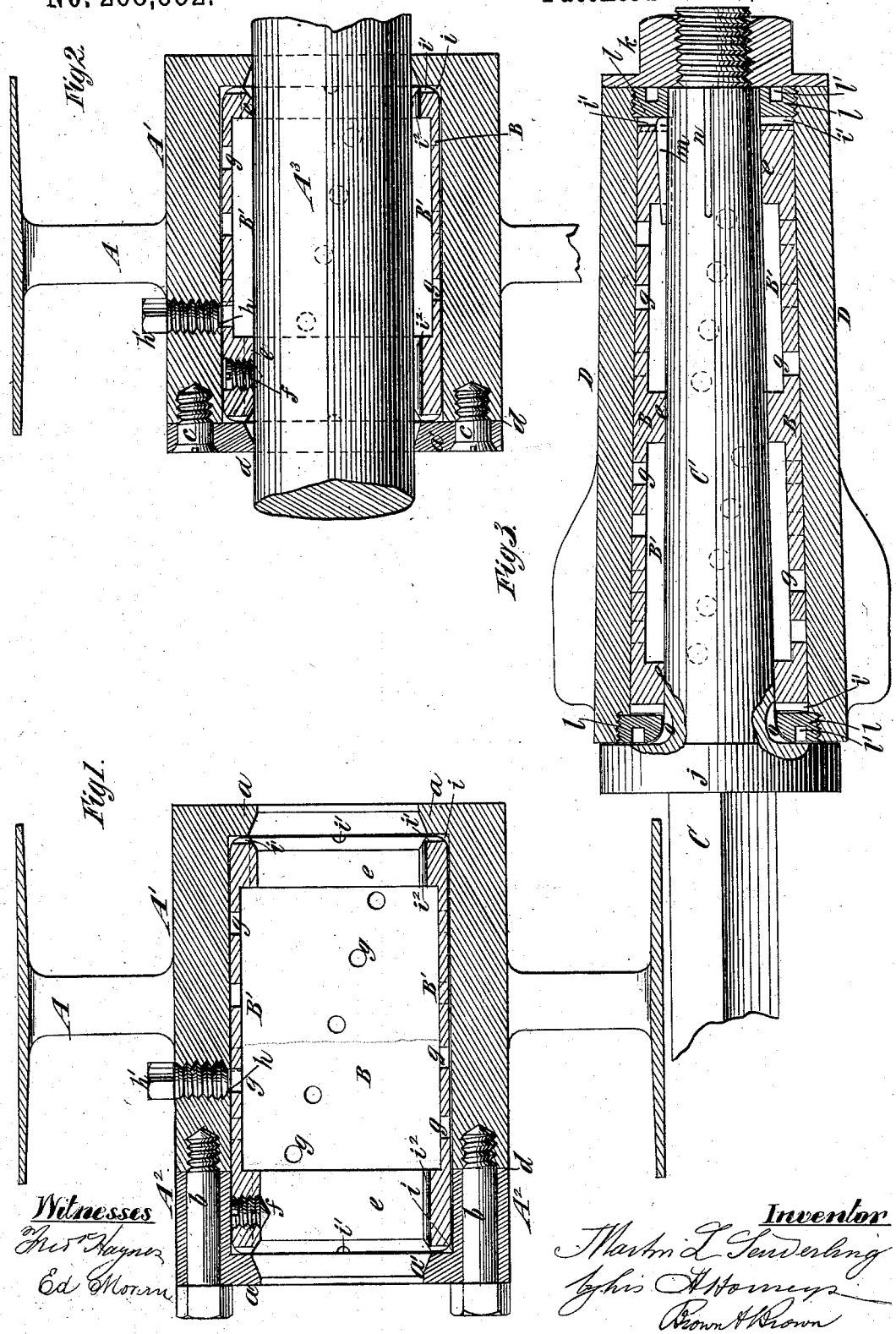

MARTIN L. SENDERLING, OF JERSEY CITY, NEW JERSEY.

BEARING FOR LOOSE PULLEYS, &c.

SPECIFICATION forming part of Letters Patent No. 268,552, dated December 5, 1882.

Application filed March 20, 1882. (No model.)

*To all whom it may concern:*

Be it known that I, MARTIN L. SENDERLING, of Jersey City, in the county of Hudson and State of New Jersey, have invented certain new and useful Improvements in Bearings for Loose Pulleys, Wheels, &c., of which the following is a specification.

My invention is applicable to loose pulleys, axle-boxes, rotary drums, pulley-block sheaves, and generally to all wheels which are adapted to turn independently of the journals, shafts, or axles on which they are mounted, whether the latter be also adapted to turn or are fixed.

The object of the invention is to provide a true and perfect bearing for such pulleys or wheels, even though the shafts or axles on which they are placed be cut or worn, and also to provide for the proper lubrication of such bearings without necessitating frequent oiling.

To these ends my invention consists in the combination, with the hub or box of a pulley or wheel, of a sleeve for a shaft or axle on which the hub or box may turn, which is provided with an internal recess or cavity, so that when placed upon the shaft or axle an oil-chamber will be formed between the shaft or axle and sleeve, but wholly in the latter, and which is also provided with apertures leading from said chamber to its outer periphery. This sleeve is to be secured upon a shaft or axle, so as to rotate or remain fixed therewith, and as the pulley or wheel on the sleeve rotates the oil or lubricating material flows through the aforesaid apertures to the periphery of the sleeve and properly lubricates the contact-surfaces of the sleeve and the hub or box.

The invention also consists in the combination, with the above, of a shaft or axle to which the sleeve is secured, and in details of construction, to be hereinafter described, whereby the sleeve is held in the hub or box of the pulley or wheel, so that it may be removed and replaced, and whereby the more uniform distribution of the lubricating material is provided for.

In the accompanying drawings, Figure 1 represents an axial section of a pulley embodying my invention. Fig. 2 represents a similar section of a pulley of slightly-modified construction, also embodying my invention; and Fig. 3 represents a longitudinal section of an axle-box, also embodying my invention.

Similar letters of reference designate corresponding parts in all the figures.

Referring, first, to Figs. 1 and 2, A designates a loose pulley, and A' designates the hub thereof. The hub is provided at one end with a fixed flange, $a$, extending inward, and at the opposite end with a removable flange, $a'$. In Fig. 1 the flange $a'$ is represented as formed integral with a ring, $A^2$, which constitutes a part of the hub, and is secured thereto by stud-bolts $b$; but in Fig. 2 the flange $a'$ is represented as secured directly to the hub by screws $c$. In either case the joint $d$ should be oil-tight, so that the two flanges $a\ a'$ will form an annular chamber or recess in the hub A', and the flanges are adapted to loosely fit at their outer sides the shaft, journal, or axle $A^3$, on which the pulley is to rotate, and are represented as flared inward.

In the hub A', between the flanges $a\ a'$, is fitted cylindric sleeve B, which is recessed between the ends, so as to form an annular cavity, B', leaving a bearing-surface, $e$, at each end. When the sleeve is placed upon the shaft the cavity B' will form an oil-chamber between the shaft and sleeve, but wholly in the latter. This sleeve B is intended to be secured fast to the shaft, journal, or axle $A^3$, on which the pulley is mounted, by means of a short set-screw, $f$, as shown in Fig. 2, or in any other suitable manner, and the sleeve may be secured in place when removed from the hub A', and the hub afterward slipped upon it; or the hub may have a hole, which is brought opposite the set-screw as the pulley is turned, and through which a screw-driver may be inserted for tightening the screw $f$ upon a shaft or axle, the said hole being afterward closed oil-tight by a plug. In the sleeve B are series of apertures $g$, leading from the chamber or cavity B' to the periphery, and these apertures may be arranged spirally in rows, with the apertures in each row arranged in staggered relation to or intermediately between those of adjacent rows, as already shown. In the hub A' is an oil-hole, $h$, which may be closed oil-tight by a bottoming plug or screw, $h'$, and when the pulley is turned so as to bring the oil-hole to opposite one of the apertures $g$ oil may be poured in until it rises to the shaft or axle, so that a considerable supply of oil will be retained by the flanges $a\ a'$.

The outer angles or corners of the sleeve B may be chamfered off, as clearly shown at $i$, so as to form a small annular channel between it and the hub, and from this channel notches $i'$ may extend inward to the bearing-surfaces $e$, so as to lubricate the ends of the sleeve.

In order to enable oil which passes between the ends of the sleeve and the flanges $a\ a'$ to return to the chamber B', the portions $e$ of the sleeve which bear on the shaft may be provided with openings $i^2$, as clearly shown, through which oil may return to said chamber. By this construction I provide for copiously supplying lubricating material to the wearing-surfaces of the sleeve and hub, and the supply of lubricating material in the chamber or cavity B' will not require to be often replenished.

Referring, now, to Fig. 3, C designates an axle, and C' the arm or journal thereof, which is provided with the usual fixed collar, $j$, and nut $k$.

B designates the sleeve, which, as here shown, is constructed with two internal oil-cavities, B', and three bearing-surfaces, $e$. When the sleeve is placed upon the axle the cavities B' will form oil-chambers between the axle and sleeve, but wholly in the latter.

D designates the axle-box, provided at the ends with flanges $l$, which as here represented consist of rings or collars screwed into the ends of the box D so tightly as to form oil-tight joints. These rings or collars fit the axle arm or journal C' loosely, and are provided with holes $l'$, or are otherwise constructed so that a special wrench can be applied for screwing or unscrewing them.

The sleeve B may be secured on the axle-arm C' by a small key, $m$, as clearly shown, so that it will remain fixed therewith while the box D turns upon it. The sleeve B is constructed with the apertures $g$, before described, and with notches $i'$ in the ends, for conducting oil to lubricate the ends of the sleeve; and the axle-arm may be provided at its outer end with a small groove, $n$, for conducting oil to lubricate the surfaces of the flange $l$ and the end of the hub D, which work against the flange of the nut $k$. The axle-arm may likewise be provided at its inner end with small grooves $o$, for conducting oil to lubricate the surfaces of the flange $l$ and box D which are in contact with the collar $j$ on the axle C.

By my invention I provide for the very thorough lubrication of loose pulleys, and axle boxes and sleeves very similar to those herein described may be applied to the drums of hoisting-machines, to pulley-block sheaves, and to other rotary devices or wheels in various kinds of machinery.

Instead of the chamber B' being of strictly annular form, it may be divided by longitudinal ribs which have a bearing on the shaft or axle.

What I claim as my invention, and desire to secure by Letters Patent, is—

1. The combination, with a hub or box for a pulley or wheel, of a sleeve for a shaft or axle on which the hub or box may turn, which is provided with an internal recess or cavity, so that when placed on a shaft or axle an oil-chamber will be formed between said shaft or axle and sleeve, but wholly in the latter, and which is also provided with apertures leading from said chamber to its periphery, substantially as and for the purpose specified.

2. The combination, with the shaft, of the sleeve B, adapted to be slipped along the same, and provided with the internal cavity or recess, B', so that when placed upon the shaft an oil-chamber will be formed between the shaft and sleeve, but wholly in the latter, and which is also provided with the apertures $g$, leading from said chamber to its periphery, means for detachably securing said sleeve upon the shaft, and the pulley-hub A', mounted and adapted to rotate upon said sleeve, substantially as and for the purpose specified.

3. The combination, with the pulley-hub A', provided with fixed flange $a$ and the removable flange $a'$, of the sleeve B, containing the chamber or cavity B', and provided with apertures $g$, annular channel $i$, and notches $i'$, substantially as and for the purpose specified.

MARTIN L. SENDERLING.

Witnesses:
FREDK. HAYNES,
CHANDLER HALL.